United States Patent [19]

Herbert

[11] Patent Number: 4,528,824

[45] Date of Patent: Jul. 16, 1985

[54] FROZEN DRINK APPARATUS

[76] Inventor: John M. Herbert, 331 Normandy Dr., Norwood, Mass. 02062

[21] Appl. No.: 639,420

[22] Filed: Aug. 10, 1984

[51] Int. Cl.³ .............................................. A23G 9/00
[52] U.S. Cl. ...................................... 62/331; 62/342; 99/484
[58] Field of Search ........................ 62/331, 342, 343; 99/484; 366/144

[56] References Cited

U.S. PATENT DOCUMENTS

| | | | |
|---|---|---|---|
| 1,938,880 | 12/1933 | White | 62/342 X |
| 2,263,794 | 11/1941 | Wyen | 62/342 X |
| 2,775,877 | 1/1957 | Bruntjen | 366/144 X |
| 2,905,449 | 9/1959 | Belk et al. | 62/342 X |
| 3,276,633 | 10/1966 | Rahauser | 62/342 X |

Primary Examiner—William E. Tapolcai
Attorney, Agent, or Firm—Wolf, Greenfield & Sacks

[57] ABSTRACT

Apparatus for efficiently preparing frozen drinks, such as frozen soft drinks and frozen cocktails, is disclosed. The apparatus includes apparatus for preparing frozen, semi-solid ice "slush". The output of the slush-making apparatus is delivered gradually to a blender cup in which additional ingredients of the drink have been added. The use of the slush rather than solid ice, and the gradual addition of the slush, prevents burn-out of the blender motor while reducing drink preparation time and ensuring a thorough blending of the drink ingredients.

6 Claims, 5 Drawing Figures

FROZEN DRINK APPARATUS

FIELD OF THE INVENTION

This invention relates to machines for preparing frozen drinks, such as frozen soft drinks and cocktails, which consist of pulverized ice, flavoring and other ingredients.

BACKGROUND OF THE INVENTION

Recently, the popularity of "frozen" drinks has been increasing dramatically. These drinks typically consists of a mixture of flavorings, liquor and/or other ingredients and a finely-divided ice/water mixture which has the consistency of a thin paste. This type of drink is often called a "slush" drink because the consistency of the drink resembles its namesake in both viscosity and texture.

The most conventional way of making such a frozen drink is to place all the ingredients of the drink, including ice in the form of cubes or crushed ice, in a blender. The blender is then operated for the considerable amount of time required until the ice has become finely divided. The mixture is then transferred to a drinking glass for consumption.

One of the main problems with the usual method of making frozen drinks is that start-up of the motor under peak load conditions—i.e., with the blender filled with ice and other ingredients—often causes damage to the blender motor, requiring rebuilding or replacement of the motor unit. Such repair must normally be carried out at an electrical motor service company, depriving the bar or restaurant of the use of the blender while involving significant expense.

A further problem associated with the conventional method is that time is consumed by the blender in pulverizing the ice in the drink, and thus the number of customers who can be served within a given time period is reduced. Finally, use of ice cubes or chopped ice causes the blender to make a great deal of noise while reducing the ice to a more liquid state.

It is therefore an object of the present invention to provide apparatus which can make frozen drinks quickly and efficiently.

It is another object of the present invention to provide apparatus which can make frozen drinks without frequent breakdown of the blender motor.

It is yet another object of the present invention to provide apparatus which can make frozen drinks more rapidly, and preferably more quietly, than conventional blenders.

SUMMARY OF THE INVENTION

The foregoing objects are achieved and the foregoing problems are solved by one illustrative embodiment of the invention in which an ice-slush making apparatus is combined with a blender in a single unit. The output of the slush-making apparatus discharges directly into the blender cup, in which there has been added a pre-measured amount of other drink ingredients (liquor, water, fruit, etc.). The slush-maker and the blender are preferably electrically wired together in such a way that the blender automatically turns on a short time after the slush maker is turned on, and thus after some amount of slush has been delivered to the blender cup. A sealed deck is also affixed to the blender to prevent damage to the blender motor by liquids and spilled ice.

In the preferred embodiment of the invention the slush machine and blender are incorporated in a single unit to further minimize the time required to make a frozen drink by reducing the required body movements of the bartender to a minimum number.

The gradual dispensing of the slush into the blender cup allows the blender motor to start up under a less than full load, thereby decreasing the wear and tear on the blender motor and greatly reducing the frequency of blender breakdown. Furthermore, because the slush is added gradually to the other ingredients, a more thorough and quicker blending of the product is achieved.

A further important feature of the subject invention is the significant saving of time in the preparation of frozen drinks that it affords. By reducing the number of steps required, and minimizing the physical movements required, the subject invention allows a bartender to be much more productive, resulting in increased profits for the bar or restaurant.

DETAILED DESCRIPTION OF THE PREFERRED EMBODIMENT

Figure 1:
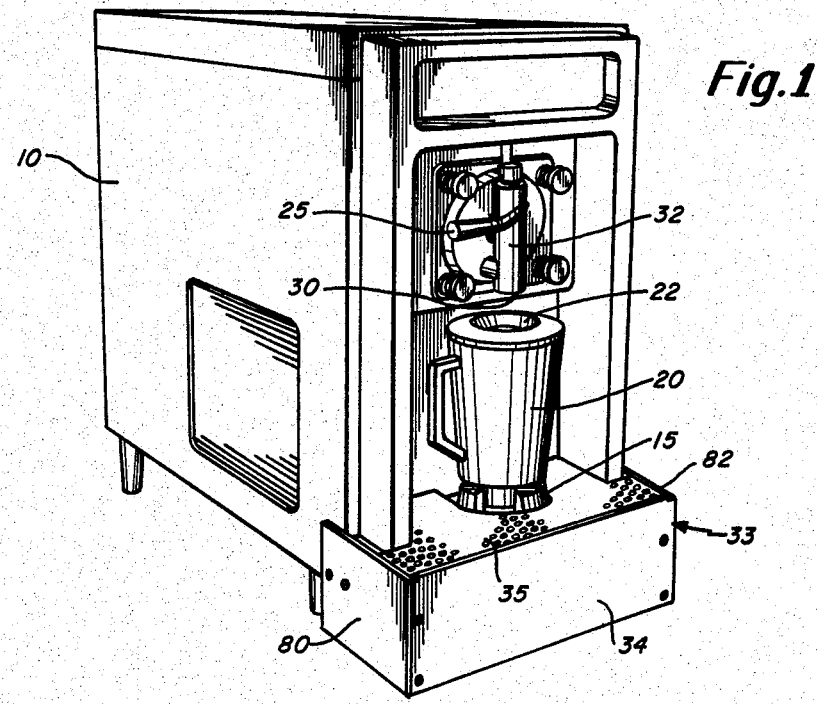
FIG. 1 is a perspective view of the combined ice slush making apparatus and blender.

FIG. 1 shows an overall perspective view of the preferred embodiment of the frozen drink apparatus. The apparatus consists of an ice-slush machine 10 and a blender unit 15. As described below, the lower front portion of the ice-slush making apparatus has been modified in order to mount the blender on it and mechanically connect the units. An ice making machine which is suitable for use with the illustrative embodiment is Model 450 made by Taylor Freezer Co. of Rockton, Ill. In this model freezer, a discharge port 30 is located at the front of the machine from which a finely-divided ice slush mixture is discharged. The machine has an internal temperature control and automatic consistency regulation.

A handle 25 is located on discharge assembly 32 which, when moved from its initial position shown in FIG. 1 towards the right, allows the ice slush made by the machine to drop from discharge port 30. Positioned below the ice machine discharge port 30 is a blender 15 which has the conventional glass or plastic cup 20 that holds the drink mixture to be blended. The opening 22 of cup 20 is located directly beneath the discharge port 30 of the ice machine.

The ice-making machine 10 has been modified by cutting away the lower front portion of the machine and adding a sheet metal enclosure 33 which completely encloses blender motor 50 (FIG. 2) and prevents spillage and other moisture from damaging the motor. The sheet metal enclosure has a perforated top 35 and underlying deck plate 45 which will be described in detail hereinafter, which prevent moisture from reaching motor 50.

Figure 2:
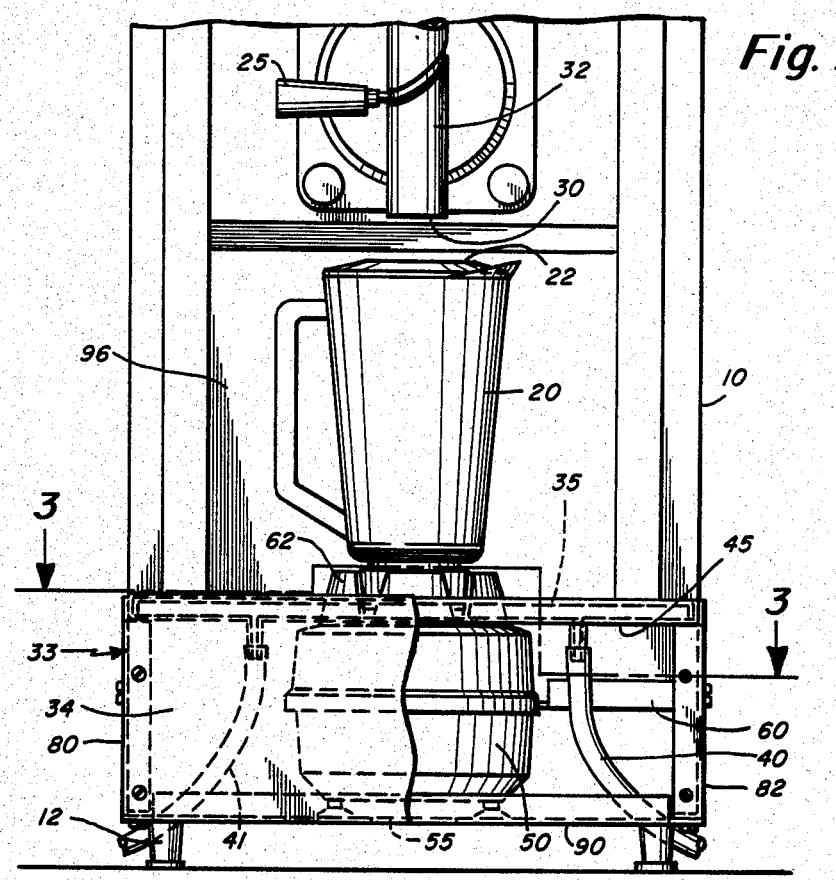
FIG. 2 is a front view of the frozen drink apparatus with the front cover plate partially broken away to show the arrangement of the blender motor and drains for the apparatus.

FIG. 2 of the drawing shows a front view of the frozen drink apparatus with the front cover 34 of the sheet metal enclosure 33 partially cut away to show the construction of the perforated top 35 and deck 45. In FIG. 2 corresponding items to those shown in FIG. 1 have been labeled with corresponding numerals.

In particular, the top of sheet metal enclosure 33 is provided with a a perforated sheet metal screen 35 and a lower deck plate 45. The upper perforated sheet 35 allows spilled liquids to drain through it while the deck 45 fits closely to blender motor 50. Excess moisture on the lower deck 45 is carried away by a pair of drain hoses 40 and 41. Therefore, the upper portion of the motor 50 is completely enclosed and is not subject to damage by moisture. A hole 55 (FIG. 3) has been cut in the bottom of the sheet metal enclosure to allow cooling air to be drawn up by the blender's conventional internal fan mechanism.

In order to mount the blender on the front of the ice making machine, it is necessary that the sheet metal enclosure extend below the normal base of the machine, which base is shown schematically as shelf 60 in FIG. 2. To provide a secure mount for the enclosure 33, a rectangular portion of the front of the ice making machine is removed and the sheet metal enclosure 33 is inserted and fastened with screws or other fasteners.

Figure 3:
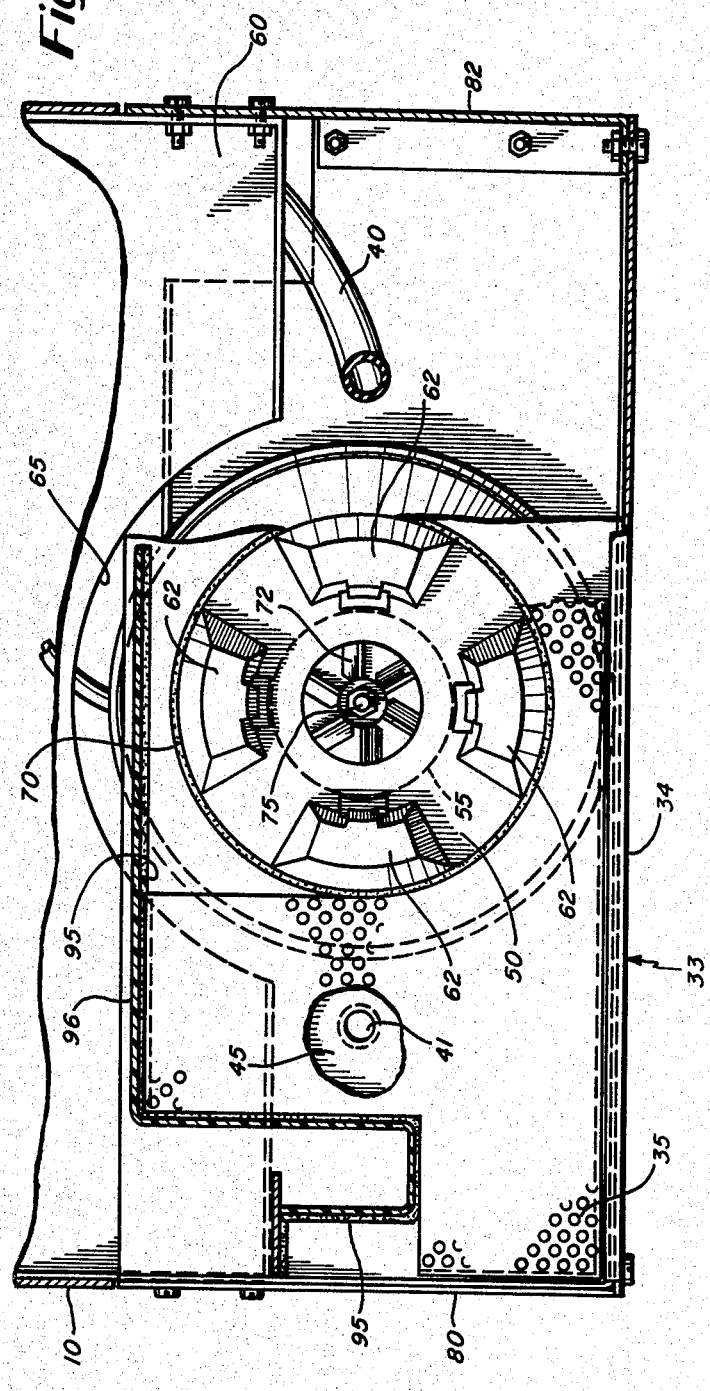
FIG. 3 is a sectional view of the blender deck located at the front of the ice-slush making machine.

FIG. 3 of the drawing shows additional modifications made to the base of the ice making machine. In particular, an approximately semi-circular cutout 65 has been removed from the platform which normally serves as the drain table of the machine to allow clearance for the blender motor. FIG. 3 also shows the location of the drain hoses 40 and 41, and of the deck 45 which is caulked (preferably with a silicone base caulking compound) at location 70 around the base of the motor 50. FIG. 3 also shows, in schematic fashion, the hole 55 which is located beneath the motor mounting to allow cooling air to be drawn through the blender mechanism by the internal cooling fan 72. The conventional blender cup or jar fits into the centering blocks 62 and communicates with the motor shaft 75.

The sheet metal enclosure 33 consists of the front panel 34 and a pair of side panels 80 and 82 which are fastened by screws or bolts or other means to the front of the ice making machine.

Figure 4:
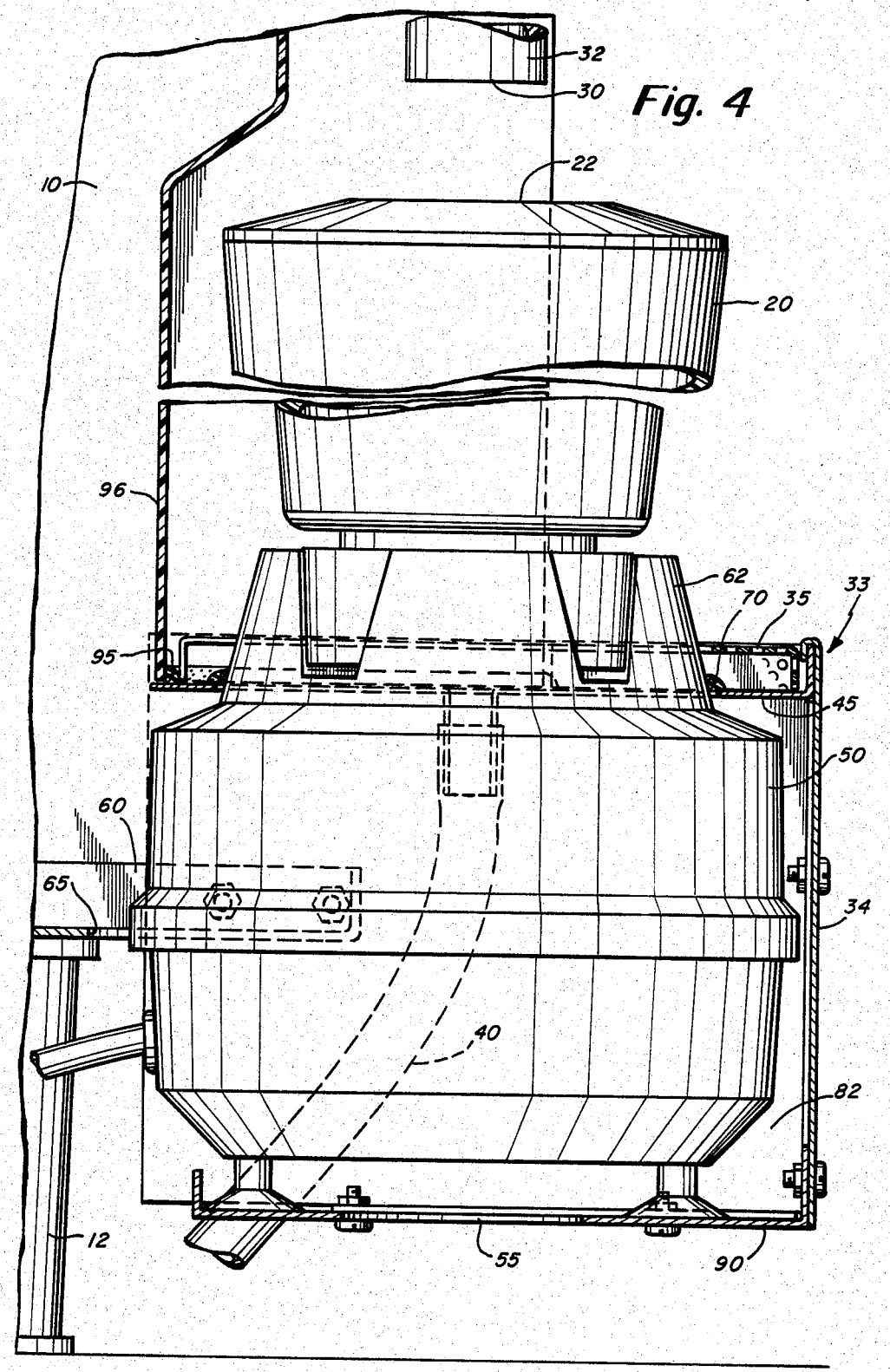
FIG. 4 is detailed sectional diagram of the sheet metal arrangement of the deck and blender enclosure.

FIG. 4 of the drawing is a side view of the enclosure 33 showing additional construction details. In particular, a detail is shown of the caulk area 70 between the drain deck 45 and the blender motor 50. An additional caulking area 95 is provided between drain deck 45 and the front panel 96 of the ice making machine to prevent leakage of moisture down the front of the ice making machine. The bottom of the sheet metal enclosure 90 is also shown containing the hole 55 for allowing cooling air to enter the blender mechanism. Also shown is the base 60 of the ice machine 10 to which the sheet metal enclosure 33 is bolted to firmly join the entire unit together.

Figure 5:
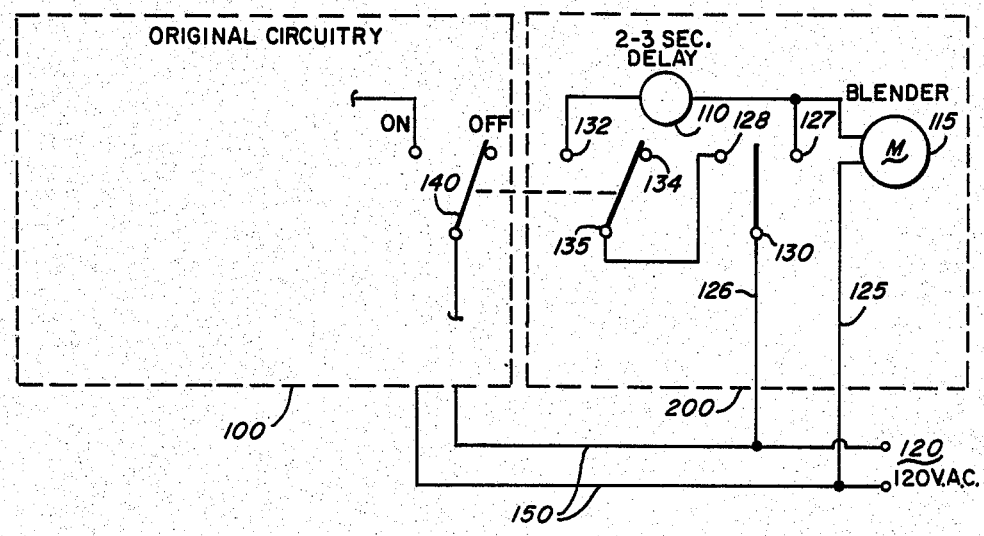
FIG. 5 is an electrical schematic diagram showing the combined wiring of the blender and ice-slush making apparatus.

FIG. 5 is an electrical schematic wiring diagram of the circuitry which causes sequential operation of the ice machine and blender. Specifically, both the ice machine and the blender are powered from the normal 120-volt main 120. The power source is connected to the ice making machine 100 via leads 150 in the normal manner. The circuitry of the ice-making machine is conventional and is not modified to operate with the invention. Circuitry shown in dotted box 200 has been added to operate both the blender and the ice-making machine together. In particular, the blender motor 115 is connected to one side of 120-volt main 120 by lead 125. The other side of the blender motor is connected to switch terminal 127 and delay unit 110.

Terminal 127 is part of a single-pole, double-throw switch consisting of terminals 127, 128 and arm 130. Arm 130 is attached by lead 126 to the other side of the 120-volt main 120. Terminal 128 is, in turn, attached to the arm 135 of another single-pole, double-throw switch consisting of terminals 132 and 134 and arm 135. Terminal 132 is connected to delay unit 110. Switch arm 135 is mechanically connected to a switch 140 in the ice-making machine so that operation of the ice-making machine turns on the blender after a short time delay. In the preferred embodiment, the switch in the ice-making machine to which arm 135 is attached is the beater draw switch.

The circuitry operates as follows: switch 130 may be set in either of two positions. When arm 130 is connected to terminal 127, the blender motor immediately turns on since it is connected directly across the 120 volt main 120. However, when arm 130 is connected to terminal 128, the operation of the blender motor is slaved to the ice-making machine.

Specifically, blender motor 115 remains inoperative (due to the fact that arm 135 is connected to terminal 134) until the beater of the ice machine is operated by means of switch 140. When switch 140 is shifted to its "on" position, arm 135 is moved to terminal 132 and current thus passes, via lead 126, arm 130, terminal 128, arm 135 and terminal 132 to delay unit 110. Unit 110 is a conventional delay unit which may be either a thermal or an electronic delay of two to three seconds. Thus, within two to three seconds, power is applied to the blender motor 115 causing to it to turn on slightly after the ice mixture is delivered to the blender. This time delay serves to prevent the ingredients in the blender from flying up and splashing, which would occur if the blender were activated prior to the addition of any appreciable amount of ice slush.

Although only one illustrative embodiment of the invention has been disclosed, other changes and modifications will be immediately apparent to those skilled in the art. For example, the blender and ice-making machine could be operated from different switches or from foot pedals or other arrangements.

What is claimed is:

1. Frozen drink apparatus comprising in combination, means for preparing and delivering a finely-divided ice/slush mixture,
a blender having a blender cup for receiving said ice/slush mixture, and
electrical delay means connected to said ice/slush preparation means and to said blender for starting said blender after a predetermined time delay has elapsed from commencement of the delivery of said ice/slush mixture to said blender cup.

2. Frozen drink apparatus comprising in combination, means for preparing and delivering a finely-divided ice/slush mixture,
a blender having a blender cup for receiving said ice/slush mixture, said blender further having a motor located directly below said blender cup,
a drain deck located above said blender motor, said drain deck fitting tightly to said motor and preventing moisture from reaching said motor, and electrical delay means connected to said ice/slush preparation means and to said blender for starting said blender after a predetermined time delay has elapsed from commencement of the delivery of said ice/slush mixture to said blender cup.

3. Frozen drink apparatus according to claim 2 further comprising means for completely enclosing said blender motor.

4. Frozen drink apparatus according to claim 3 further comprising a perforated panel located directly above said drain deck.

5. Frozen drink apparatus according to claim 4 further comprising at least one drain hose communicating with said drain deck for draining moisture from said deck.

6. Frozen drink apparatus comprising in combination, an ice machine for preparing a finely-divided ice/slush mixture, said ice machine having a refrigeration system and internal beater mechanism and a discharge port for delivering an ice/slush mixture, a blender having a blender cup for receiving said ice/slush mixture and a blender motor located directly below said blender cup, a sheet-metal enclosure for completely enclosing said blender motor, means connecting said enclosure to said ice machine so that said blender cup is located immediately below said discharge port, a drain deck located above said blender motor, said drain deck fitting tightly to said motor and to said enclosure and preventing moisture from reaching said motor, at least one drain hose communicating with said drain deck for draining moisture from said deck, a perforated panel located directly above said drain deck, means for allowing cooling air to enter said enclosure to prevent said blender motor from overheating, electrical means connected to said ice machine and to said blender for conditioning said blender to operate when said ice machine beater mechanism is operated, and a time delay unit for starting said blender after a predetermined time delay has elapsed from the operation of said beater mechanism.

* * * * *